United States Patent [19]

Westercamp et al.

[11] Patent Number: 4,741,409
[45] Date of Patent: May 3, 1988

[54] ELECTRIC STEERING SYSTEM FOR AUTOMOBILES

[75] Inventors: Kenneth L. Westercamp, Frankenmuth; Steven J. Hallman, Saginaw, both of Mich.

[73] Assignee: General Motors Corporation, Detroit, Mich.

[21] Appl. No.: 66,655

[22] Filed: Jun. 25, 1987

[51] Int. Cl.$^4$ .............................................. B62D 5/04
[52] U.S. Cl. .................................... 180/79.1; 180/152; 180/153; 180/140; 180/148
[58] Field of Search ............... 180/140, 148, 152, 153, 180/79.1; 74/388 PS, 422

[56] References Cited

U.S. PATENT DOCUMENTS

| | | | |
|---|---|---|---|
| 3,972,379 | 8/1976 | Norris | 180/140 |
| 4,367,803 | 1/1983 | Wittren | 180/153 |
| 4,552,239 | 11/1985 | Kanazawa | 180/140 |

*Primary Examiner*—John J. Love
*Assistant Examiner*—Donn McGiehan
*Attorney, Agent, or Firm*—Saul Schwartz

[57] ABSTRACT

An electric steering system for automobiles includes a tubular main housing disposed on a transverse axis of the vehicle between two steerable road wheels. A left steering rack is slidably disposed in the main housing and connected to the left road wheel. A right steering rack is slidably disposed in the main housing and connected to the right road wheel. A pair of reversible electric motors at opposite ends of the main housing drive the steering racks independently of each other through corresponding pinion drive assemblies. The inboard end of the left steering rack telescopes into a bore in the inboard end of the right steering rack. The inboard end of the left steering rack has an annular shoulder which is captured in the bore by a rack rack nut on the inboard end of the right steering rack so that withdrawal of the left steering rack from the bore is prevented. The telescopic connection permits enough relative movement between the steering racks to allow an electronic control to optimally position each road wheel during steering maneuvers but is sufficiently small that the wheels can be acceptably steered together by one motor if the other becomes inoperative.

4 Claims, 2 Drawing Sheets

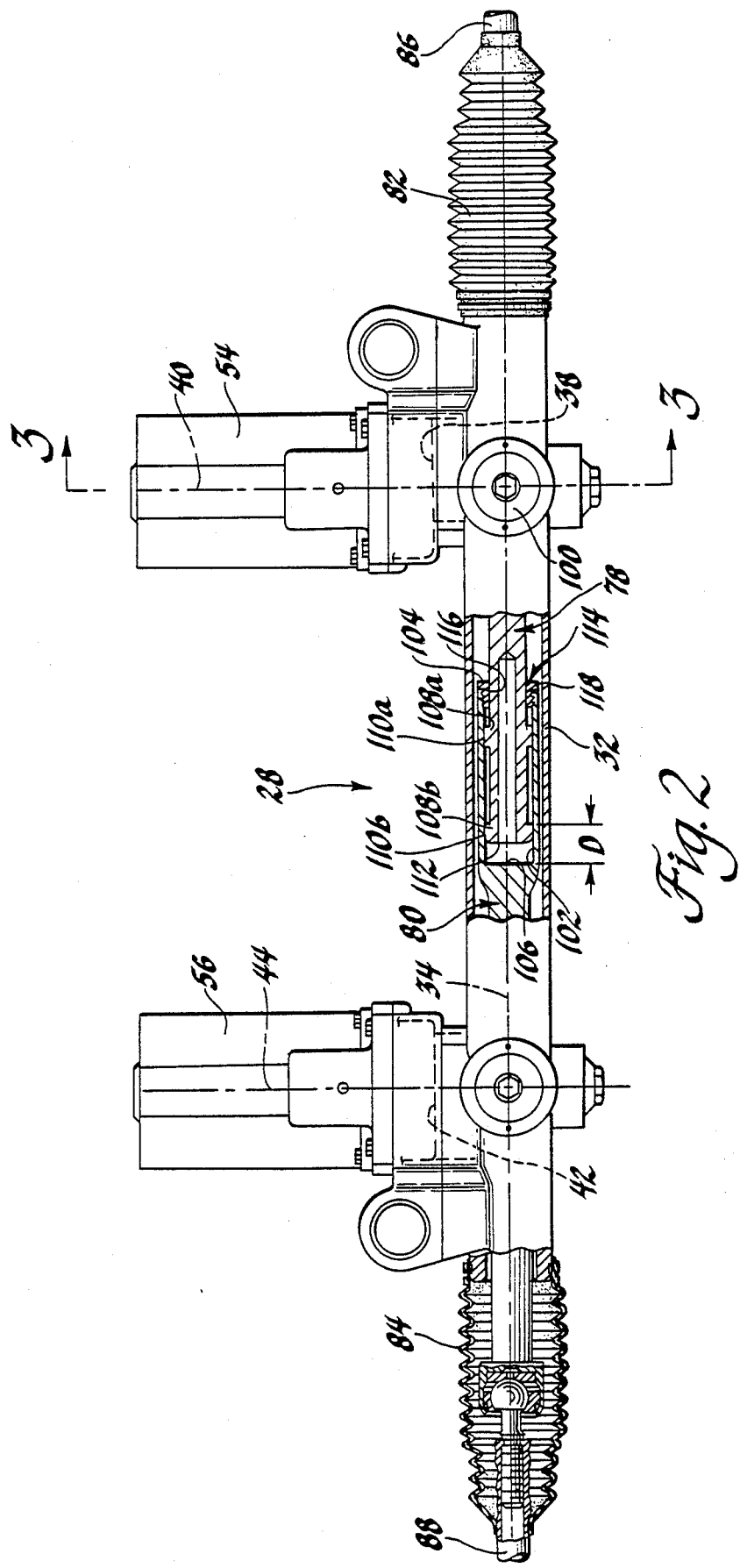

ELECTRIC STEERING SYSTEM FOR AUTOMOBILES

BACKGROUND OF THE INVENTION

1. Field of the Invention

This invention relates generally to electric steering systems for automobiles and, more particularly, to such systems where each wheel is steered electrically and independently of the other wheels.

2. Description of the Prior Art

In typical four-wheel steering systems, the front pair of wheels are interconnected in conventional fashion for synchronized steering movement and are steerable separately from the rear pair of wheels which are similarly connected to each other for synchronized steering movement. Where steering is power assisted, hydraulic and/or electrical actuators steer the pairs of wheels in response to control inputs from an operator controlled implement such as a steering wheel. In automobile four-wheel steering systems, the typical practice is to provide a train of mechanical links between the steering wheel and each of the pairs of steered wheels to assure control in the event that the power assist becomes inoperative. In some vehicle applications where speed is always relatively slow, electro-hydraulic four wheel steering systems have been proposed where no mechanical connection exists between the steering wheel and the steered wheels of the vehicle. In such systems, the four wheels are independently pivotable on the vehicle chassis by respective ones of four hydraulic cylinders which are pressurized and exhausted by an electronic control in response to manual steering inputs from the operator of the vehicle. These systems may lack the rapid response capability required in automobile steering systems and are unprotected if hydraulic assist is lost. A steering system according to this invention represents an improvement over prior systems in that it combines in one system the advantages of independent, electrically powered steering of each of the four wheels of the vehicle with a simple and effective mechanical interlock which maintains acceptable steering control in the event one electric motor of the front or rear pair of motors becomes inoperative.

SUMMARY OF THE INVENTION

This invention is a new and improved steering system for automobiles wherein each of the four wheels is electrically steered independently of the other wheels. In the steering system according to this invention, each wheel is independently pivotable about a generally vertical axis of the vehicle and is connected to one end of a corresponding one of four steering racks on the vehicle. The steering racks are arranged in front and rear pairs aligned on respective ones of a pair of front and rear transverse axes of the vehicle. Four reversible electric motors drive the steering racks through four pinion drive assemblies and are switched on and off by an electronic control responsive to an operator's manual steering inputs to translate the steering racks along the transverse axes to steer the vehicle. An inboard end of one steering rack of each of the front and rear pairs of racks is closely slidably received by the inboard end of the other of the steering racks in that pair so that the inboard ends of the related pairs slide through a predetermined maximum amplitude of relative telescoping movement during normal steering of the vehicle. Interlocks are provided on the inboard ends of the related pairs of steering racks which operate automatically to positively prevent relative telescoping movement of the racks beyond the predetermined maximum amplitude so that if the one electric motor ceases operation, the other motor effects acceptable control over both steering racks in the pair.

BRIEF DESCRIPTION OF THE DRAWINGS

FIG. 2 is an enlarged partially broken away plan view of a portion of FIG. 1.

DESCRIPTION OF PREFERRED EMBODIMENT

Figure 1:
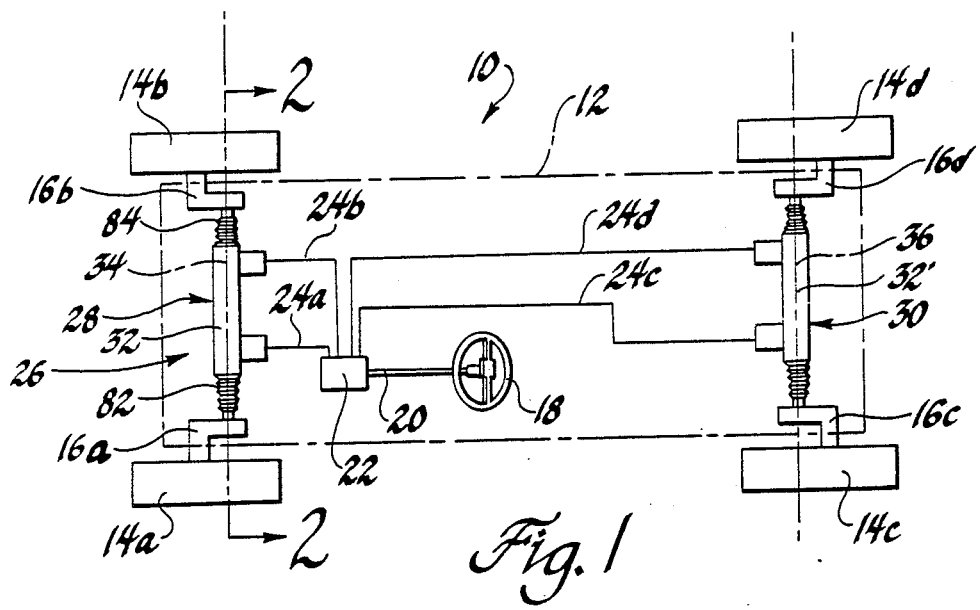
FIG. 1 is a schematic plan view of an automobile having a steering system according to this invention.

Referring now to FIG. 1, an automobile 10 has a schematically illustrated chassis 12. A left front wheel 14a, a right front wheel 14b, a left rear wheel 14c, and a right rear wheel 14d are supported on the chassis 12 for independent pivotal movement about respective ones of four generally vertical steering axes, not shown, of the vehicle. Four steering knuckles 16a, 16b, 16c, and 16d are connected to the wheels 14a–d, respectively, and provide conventional attachment points for linkage operative to pivot the wheels about their corresponding steering axes.

The automobile 10 further includes a manually operated steering wheel 18 which turns a steering shaft 20 connected to an electronic control module 22. The module 22 is a computer which, through the steering shaft and the steering wheel, senses the manual steering inputs of the driver. The module 22, through appropriate transducers, not shown, similarly senses various vehicle parameters such as instantaneous accelerations of the chassis and of each of the road wheels. Based on these instantaneous inputs, the module 22 computes by conventional algorithms the most optimum instantaneous steering angle for each of the road wheels. For the left and right front wheels and for the left and right rear wheels, the steering angles thus computed will be close but different enough to optimize ride and handling. The optimum instantaneous steering angles are then translated into electrical signals dispatched through four control wires 24a, 24b, 24c and 24d to an electric steering system 26 according to this invention. The control module 22 and the algorithms by which the instantaneous optimum steering angles of the wheels are computed are conventional and form no part of this invention.

Figure 3:
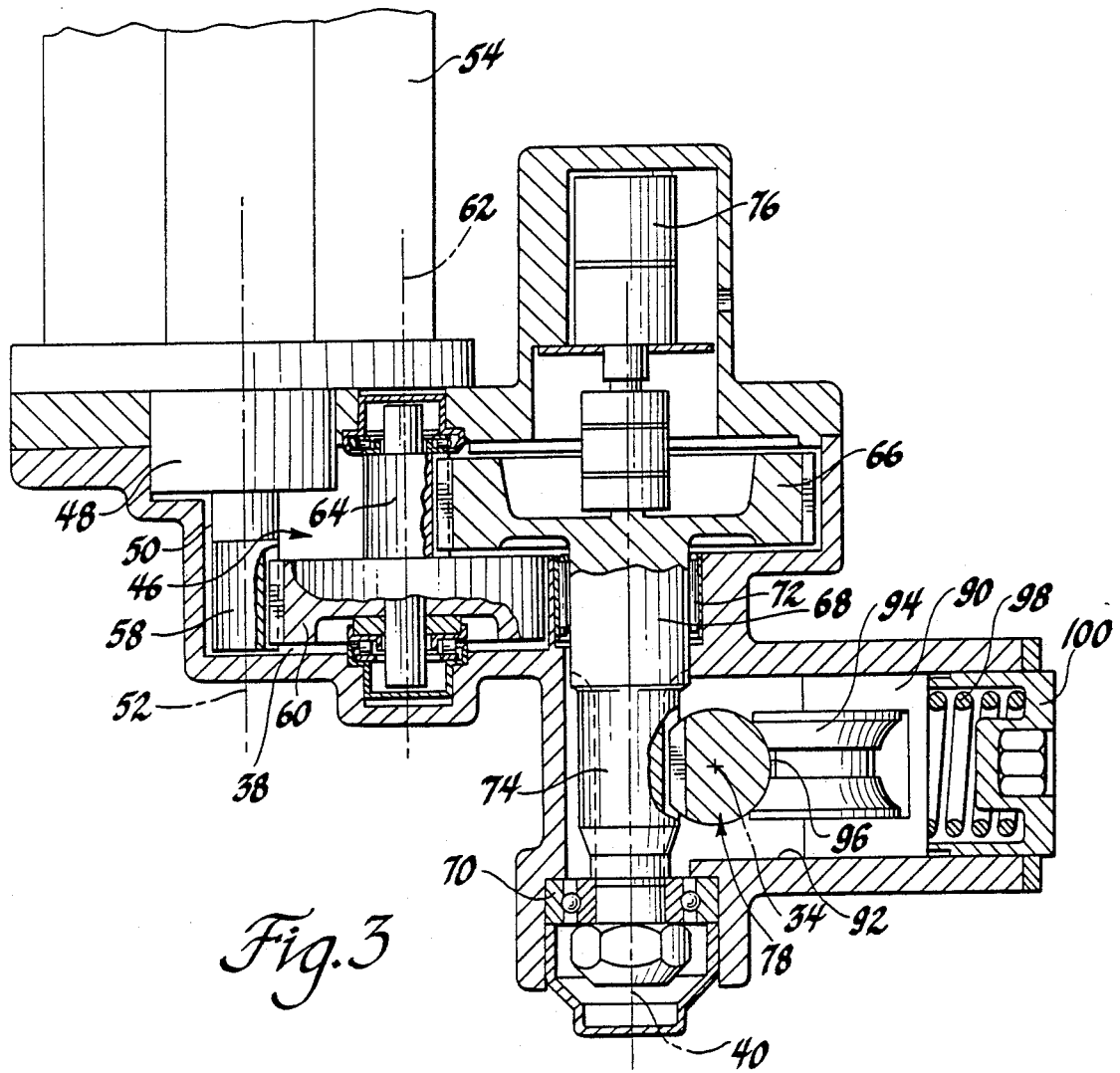
FIG. 3 is a sectional view taken generally along the plane indicated by lines 3—3 in FIG. 2.

With reference to FIGS. 1–3, the steering system 26 includes a front unit 28 and an identical rear unit 30. For brevity and simplicity, only the front unit 28 is described in detail herein. Elements in the rear unit 30 corresponding to described elements in the front unit are identified by the same reference character primed. The front unit 28 includes a tubular main housing 32 rigidly attached to a structural portion of the chassis 12 and aligned on a front transverse axis 34 of the vehicle. In the rear unit 30, the tubular main housing 32' is rigidly connected to a structural portion of the chassis and is aligned on a rear transverse axis 36 of the vehicle. The main housing 32 includes an open chamber 38 on the left side centered on a left pinion axis 40 perpendicular to but not intersecting the front transverse axis 34 and an open chamber 42 on the right side centered on a right pinion 44 perpendicular to but not intersecting the transverse axis 34. A left pinion drive assembly 46 is disposed in the left open chamber 38 and an identical right pinion drive assembly, not shown, is disposed in the right open chamber 42.

As seen best in FIG. 3, the left pinion drive assembly 46 includes a reversible electric motor 48 having an armature shaft 50 aligned on an axis 52 parallel to and in the same vertical plane as axis 40. The remainder of the motor 48 is enclosed within a generally cylindrical cover 54 bolted to the main housing 32 and closing the left open chamber 38. On the right side of the main housing, a cover 56 encloses a reversible electric motor, not shown, like the motor 48 and closes the right open chamber 42.

The armature shaft 50 has a first pinion 58 formed on its distal end. The first pinion 58 meshes with a first reduction gear 60 supported on the main housing within left chamber 38 for rotation about an intermediate axis 62 parallel to axes 40 and 52. A second pinion 64 is supported on the main housing within the left chamber for rotation about the intermediate axis as a unit with the first reduction gear and meshes with a second reduction gear 66. The second reduction gear 66 is an integral part of a pinion shaft 68 which is supported on the main housing 32 for rotation about the left pinion axis 40 by ball bearing 70 and by a roller bearing 72. The pinion shaft further includes an integral third pinion 74 disposed or straddle mounted between the bearings 70 and 72 and rotatable about the left pinion axis 40. A position transducer 76 is disposed in a chamber in the cover 54 and monitors the angular position of the pinion shaft 68.

As seen best in FIGS. 2 and 3, the front unit 28 further includes a left steering rack 78 and a right steering rack 80 each disposed within the tubular main housing 32 and aligned on the front transverse axis 34. The left or outboard end of the left steering rack projects beyond the left end of the main housing 32 within a flexible bellows 82. The right or outboard end of the right steering rack projects beyond the right end of the main housing 32 within a flexible bellows 84. A left steering tie rod 86 extends between the outboard end of the left steering rack 78 and the steering knuckle 16a whereby bodily shiftable movement of the left steering rack along the front transverse axis 34 effects steering pivotal movement of the left front wheel 14a. Likewise, a right steering tie rod 88 extends between the outboard end of the right steering rack 80 and the steering knuckle 16b whereby bodily shiftable movement of the right steering rack along the front transverse axis 34 effects steering pivotal movement of the right front wheel 14b.

As seen best in FIG. 3, the left steering rack 78, aligned on the front transverse axis 34, extends below and generally perpendicular to the pinion shaft 68. The left steering rack has a plurality of rack teeth thereon meshing with the teeth of the third pinion gear 74. A block 90 is slidably disposed in a bore portion 92 of the left open chamber 38 of the main housing. The block rotatably supports a roller 94 which engages or bears against a cylindrical surface portion 96 of the left steering rack 78. A spring 98 between the block 90 and a cap 100 over the bore portion 92 biases the block 90 to the left thereby urging the roller 94 against the left steering rack and the left steering rack against the third pinion 74 on the pinion shaft. An identical arrangement, not shown, supports the right end of the right steering rack 80 on the main housing 32.

Referring particularly to FIG. 2, the left or inboard end of the right steering rack 80 is enlarged and includes a blind cylindrical bore 102 therein. The bore 102 extends from an inboard annular end wall 104 to a bottom wall 106. The right or inboard end of the left steering rack 78 telescopes within the blind bore 102 and includes a pair of longitudinally spaced annular shoulders 108a and 108b. At their outside diameters, the annular shoulders 108a–b define a pair of cylindrical surfaces 110a and 110b, respectively, having substantially the same diameter as the bore 102. Accordingly, the shoulders 108a–b define longitudinally spaced slide bearings between the right and left steering racks which permit only relative telescoping sliding movement along the front transverse axis 34 between the steering racks. The slide bearings thus defined cooperate with the roller 94 at the left end of the left steering rack 78 and the corresponding roller at the right end of the right steering rack 80 in supporting the left and right steering racks on the main housing 32 for independent bodily shiftable movement in either of two opposite directions along the front transverse axis 34.

In the direction of telescoping collapse, relative movement between the left and right steering racks 78 and 80 is limited by engagement of an inboard end wall 112 of the left steering rack 78 on the bottom wall 106 of the bore 102 in the right steering rack. In the direction of telescoping extension, relative movement between the left and right steering racks is limited by an annular rack nut 114. The nut 114 has an inside bore 116 which slidably receives an outside cylindrical surface of the left steering rack 78. The nut 114 is threaded into the bore 102 in the right steering rack until a head portion 118 of the nut abuts the inboard end wall 104 of the right steering rack. Relative telescoping extension between the steering racks is limited by engagement of the annular shoulder 108a against the nut 114. The amplitude or range of relative telescoping movement between the left and right steering racks is represented by a dimension D, FIG. 2.

Referring to FIG. 2 and 3 and describing the operation of pinion drive assembly 46, the motor 48 is switched on and off in either of its rotary directions by the control module 22 in accordance with manual steering inputs at the steering wheel 18. When the motor 48 is switched on, the pinion shaft 68 rotates at a speed determined by the reduction gear ratio established by the pinion gears 58 and 64 and the reduction gears 60 and 66. The third pinion gear 74 on the pinion shaft 68, through its engagement with the rack teeth on the left steering rack 78, effects bodily shiftable movement of the left steering rack along the front transverse axis 34 whereby the left front wheel by is pivoted about its steering axis.

The pinion drive assembly in the right open chamber 42 operates as just described to independently bodily shift the right steering rack 80 along the front transverse axis to effect pivotal movement of the right front wheel 14b about its steering axis. For a given set of vehicle operating conditions and a given steering input, the positions of the left and right front wheels, while independently controlled, are almost the same. However, by permitting relative telescoping movement of the left and right steering racks 78 and 80 within the limit of the dimension D, improved handling and ride characteristics are achieved.

If, during vehicle operation, a loss of power to one of the two electric motors in the front unit 28 occurs, the reverse or overdrive gear ratio between the rack teeth on the corresponding one of the steering racks 78 and 80 and the pinion gear teeth on the armature shaft of the motor which is not operating functions to initially hold that steering rack in the position it occupied at the time the motor switched off. The control module 22, however, maintains the other of the motors switched on so that the other of the steering racks 78 and 80 moves relative to the stationary steering rack. This relative movement continues until the dimension D is reached. Thereafter, a direct mechanical connection is achieved between the moving steering rack and the stationary steering rack which causes the stationary steering rack to move as a unit with the electrically driven steering rack along the front transverse axis. It is an important feature of this invention that the gear train between each motor and the corresponding steering rack is reversible so that a force input on the one of the steering racks associated with the inactive motor is effective to backdrive the armature of that motor by rotating all the gears in the corresponding gear train.

The following examples are illustrative. If the motor in cover 56 is switched off during a left turn maneuver, the right steering rack 80 stops while the left steering rack 78 collapses in telescoping fashion relative to it until the end wall 112 abuts the bottom wall 106 of the bore 102. Then, the left steering rack 78 pushes the right steering rack 80 in the same direction thereby effecting the right turn of the vehicle. Similarly, if the motor in the cover 56 stops during a right turn, the annular shoulder 108a on the left steering rack engages the end of the rack nut 114 after the dimension D is achieved, as the left steering rack extends relative to the right steering rack. Thereafter, the left steering rack pulls the right steering rack along with it to complete the turn.

When one motor in either of the front and rear units 28 and 30 stops operating while the other continues to operate, the dimension D is sufficiently small that vehicle controllability is maintained even though lost motion occurs between the steering racks when the steering wheel 18 is turned in opposite directions. What noticeable difference in steerability occurs in that situation represents an immediate alert signal to the vehicle operator that service is required.

The embodiments of the invention in which an exclusive property or privilege is claimed are defined as follows:

1. In combination with an automobile having at least one pair of steerable road wheels each pivotable independently of the other about a corresponding one of a pair of steering axes of said automobile, a manual steering implement on said automobile, and an electronic control connected to said steering implement operative to convert a manual steering input to said implement into at least two electric current outputs corresponding to said steering input,
   an electric steering system comprising:
   a tubular main housing on said automobile aligned on a transverse axis thereof between said pair of steerable road wheels,
   a first steering rack disposed in said main housing for bodily shiftable movement in opposite directions along said transverse axis and including an inboard end and an outboard end,
   a second steering rack disposed in said main housing for bodily shiftable movement in opposite directions along said transverse axis and including an inboard end and an outboard end,
   means connecting said outboard end of each of said first and said second steering racks to a corresponding one of said steerable road wheels so that bodily shiftable movement of each of said first and said second steering racks effects steering pivotal movement of said corresponding steerable road wheel,
   a first reversible electric motor mounted on said main housing and connected to one of said electric current outputs whereby said first motor is selectively energized by said electronic control,
   a second reversible electric motor mounted on said main housing and connected to the other of said electric current outputs whereby said second motor is selectively energized by said electronic control,
   first reversible reduction gear means between said first motor and said first steering rack operative when said first motor is energized to bodily shift said first steering rack along said transverse axis and to back drive said first motor when said first motor is deenergized and said first steering rack is forcibly bodily shifted along said transverse axis,
   second reversible reduction gear means between said second motor and said second steering rack operative when said second motor is energized to bodily shift said second steering rack along said transverse axis and to back drive said second motor when said second motor is deenergized and said second steering rack is forcibly bodily shifted along said transverse axis,
   means on said inboard end of said first steering rack and on said inboard end of said second steering rack defining a telescopeable sliding connection between said first and said second steering racks, and
   stop means on each of said first and said second steering racks operative to limit said relative telescopeable sliding movement to a predetermined dimension so that attempted relative movement beyond said predetermined dimension is accompanied by positive driving engagement of one of said first and said second steering racks on the other.

2. The steering system recited in claim 1 wherein:
   said means on said inboard end of said first steering rack and on said inboard end of said second steering rack defining a telescopeable sliding connection between said first and second second steering racks includes
   means defining a blind bore extending longitudinally from said inboard end of said first steering rack to a bottom wall of said bore, and
   means on said second steering rack at said inboard end thereof defining an outside cylindrical surface slidably received in said blind bore.

3. The steering system recited in claim 2 wherein:
   said stop means on each of said first and said second steering racks operative to limit said relative telescopeable sliding movement to a predetermined dimension includes
   an end wall on said inboard end of said second steering rack engageable on said bottom wall of said bore to limit relative telescopeable collapse between said first and said second steering racks,
   a rack nut on said first steering rack at the open end of said blind bore, and
   means defining an annular shoulder on said second steering rack engageable on said rack nut to limit relative telescopeable extension between said first and said second steering racks.

4. In combination with an automobile having a front pair of road wheels steerable independently of each other about corresponding ones of a pair of front steering axes of said automobile and a rear pair of road wheels steerable independently of each other about corresponding ones of a pair of rear steering axes of said automobile, a manual steering implement on said automobile, and an electronic control connected to said steering implement operative to convert a manual steering input to said implement into four electric current outputs corresponding to said steering input, an electric steering system comprising:

a front tubular main housing on said automobile aligned on a front transverse axis thereof between said front pair of steerable road wheels, a rear tubular main housing on said automobile aligned on a rear transverse axis thereof between said rear pair of steerable road wheels, a first steering rack disposed in each of said front and said rear main housings for bodily shiftable movement in opposite directions along the corresponding one of said front and said rear transverse axes and each including an inboard end and an outboard end, a second steering rack disposed in each of said front and said rear main housings for bodily shiftable movement in opposite directions along the corresponding one of said front and said rear transverse axes and each including an inboard end and an outboard end, means connecting said outboard end of each of said first and said second steering racks to a corresponding one of said front and said rear steerable road wheels so that bodily shiftable movement of each of said first and said second steering racks effects steering pivotal movement of said corresponding steerable road wheel, a front pair of reversible electric motors mounted on said front main housing and connected to respective ones of said four electric current outputs whereby each of said front pair of motors is selectively energized by said electronic control independently of the other, a rear pair of reversible electric motors mounted on said rear main housing and connected to respective ones of said four electric current outputs whereby each of said rear pair of motors is selectively energized by said electronic control independently of the other, a reversible reduction gear train between each of said electric motors of said front and said rear pairs of motors and respective ones of said first and said second steering racks operative when a corresponding one of said electric motors is energized to bodily shift said respective steering rack along a corresponding one of said front and said rear transverse axes and to back drive said corresponding motor when said corresponding motor is deenergized and said respective steering rack is forcibly bodily shifted along said corresponding one of said front and said rear transverse axes, means on each of said first steering racks defining a blind bore extending longitudinally from said inboard end thereof to a bottom wall of said bore, means on each of said second steering racks defining an outer cylindrical wall adjacent said inboard end projecting into said blind bore in the corresponding one of said first steering racks means on each of said second steering racks defining a longitudinally spaced pair of annular shoulders on said outer cylindrical wall each having an outside cylindrical surface slidably engaging said blind bore in a corresponding one of said first steering racks whereby each of said second steering racks is telescopeable relative to said corresponding one of said first steering racks along said front and said rear transverse axes, means on said inboard end of each of said second steering racks defining an end wall engageable on said bottom wall of said bore in a corresponding one of said first steering racks to limit relative telescopeable collapse between said first and said second steering racks, and a rack nut on each of said first steering racks at an open end of said blind bore therein projecting into an annulus between said blind bore and said outer cylindrical wall of a corresponding one of said second steering racks, one of said annular shoulders on each of said second steering racks being engageable on a corresponding one of said rack nuts to limit relative telescopeable extension between said first and said second steering racks.

* * * * *